United States Patent
Raissinia et al.

(10) Patent No.: US 7,046,967 B2
(45) Date of Patent: May 16, 2006

(54) POWER REGULATION USING MULTI-LOOP CONTROL

(75) Inventors: Ali Raissinia, Monte Sereno, CA (US); Vincent K. Jones, IV, Redwood Shores, CA (US); Derek Gerlach, Mountain View, CA (US); Gregory G. Raleigh, El Granada, CA (US); Michael Pollack, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 10/138,238

(22) Filed: May 3, 2002

(65) Prior Publication Data
US 2002/0159404 A1   Oct. 31, 2002

Related U.S. Application Data

(63) Continuation of application No. 09/348,719, filed on Jul. 6, 1999, now Pat. No. 6,408,165.

(51) Int. Cl.
*H04B 1/00* (2006.01)

(52) U.S. Cl. .............. 455/69; 455/67.11; 455/522; 455/13.4; 370/318; 370/332

(58) Field of Classification Search ............ 455/68–70, 455/522, 67.11, 115.1, 115.2, 115.3, 524, 455/526, 656, 13.4 E, 533, 454, 13.4, 67.1, 455/126, 115, 552, 403, 127.1; 370/337, 370/318, 320, 317, 230, 328, 331, 332
See application file for complete search history.

(56) References Cited

U.S. PATENT DOCUMENTS

| | | | | |
|---|---|---|---|---|
| 5,056,109 A | | 10/1991 | Gilhousen et al. ............. 375/1 |
| 5,212,814 A | * | 5/1993 | Iwane ......................... 455/107 |
| 5,357,513 A | * | 10/1994 | Kay et al. .................... 370/332 |
| 5,465,398 A | | 11/1995 | Flammer ...................... 455/69 |
| 5,564,084 A | * | 10/1996 | Hirasawa .................. 455/115.4 |
| 5,655,220 A | | 8/1997 | Weiland et al. ............... 455/69 |
| 5,737,706 A | | 4/1998 | Seazholtz et al. ........... 455/466 |
| 5,751,702 A | * | 5/1998 | Evans et al. ................. 370/314 |
| 5,787,338 A | | 7/1998 | Priest ......................... 455/522 |
| 5,970,062 A | | 10/1999 | Bauchot ..................... 370/345 |
| 5,987,333 A | | 11/1999 | Sole ........................... 455/522 |
| 5,995,496 A | | 11/1999 | Honkasalo et al. ......... 370/318 |
| 6,035,209 A | | 3/2000 | Tiedemann, Jr. et al. ... 455/522 |

(Continued)

OTHER PUBLICATIONS

"Data-over-cable services interface specifications", 1997 Radio Frequency Interface Specification, Cable Television Laboratories.

*Primary Examiner*—CongVan Tran
(74) *Attorney, Agent, or Firm*—Cindy Kaplan

(57) ABSTRACT

Improved adjustment of transmission power in a communication system is provided. In one embodiment, in a point to multipoint communication system, transmission power of a subscriber unit is controlled based on power measurements made at a central access point. Power measurement information based on transmissions occurring at irregular intervals may be combined in a beneficial manner to control transmission output power. In one embodiment, a power regulation process determines a series of difference values indicating the differences between desired received power level at the central access point and measured received power level. A smoothing process is applied to the difference values. One or more parameters of the smoothing process vary with elapsed time since a last available power measurement.

42 Claims, 8 Drawing Sheets

U.S. PATENT DOCUMENTS

| | | | |
|---|---|---|---|
| 6,154,659 A | 11/2000 | Jalali et al. | 455/522 |
| 6,157,614 A | 12/2000 | Pasternak et al. | 370/236 |
| 6,157,619 A | 12/2000 | Ozluturk et al. | 370/252 |
| 6,311,075 B1* | 10/2001 | Bevan et al. | 455/562.1 |
| 6,408,165 B1* | 6/2002 | Raissinia et al. | 455/69 |
| 6,434,367 B1* | 8/2002 | Kumar et al. | 455/70 |
| 6,515,975 B1* | 2/2003 | Chheda et al. | 370/332 |
| 6,587,672 B1* | 7/2003 | Chuah et al. | 455/69 |
| 6,608,823 B1* | 8/2003 | Kito | 370/331 |
| 6,708,041 B1* | 3/2004 | Butovitsch et al. | 455/522 |

\* cited by examiner

POWER REGULATION USING MULTI-LOOP CONTROL

This is a continuation of Ser. No. 09/348,719 filed Jul. 6, 1999 now U.S. Pat. No. 6,408,165.

STATEMENT OF RELATED APPLICATIONS

The present application is related to the subject matter of the following co-filed, co-assigned applications.

U.S. patent application Ser. No. 09/348,646, entitled WIRELESS POWER CONTROL IN CONJUNCTION WITH A WIRELINE MAC PROTOCOL;

U.S. patent application Ser. No. 09/348,644, entitled REALTIME POWER CONTROL IN OFDM SYSTEMS;

U.S. patent application Ser. No. 09/348,647, entitled COMMUNICATION OF PHYSICAL LAYER CONTROL PARAMETERS;

U.S. patent application Ser. No. 09/348,645, entitled OPTIMAL USE OF REQUEST ACCESS TDMA SLOTS FOR AUTOMATIC LEVEL CONTROL;

U.S. patent application Ser. No. 09/348,727, entitled POLLING FOR TRANSMISSION POWER CONTROL. All of the related applications are incorporated by reference herein for all purposes.

BACKGROUND OF THE INVENTION

The present invention is related to digital communication systems and more particularly to systems and methods for controlling output power of subscriber units in a point to multipoint communication system.

A point to multipoint wireless communication system represents a potentially effective solution to the problem of providing broadband network connectivity to a large number of geographically distributed points. Unlike optical fiber, DSL, and cable modems, there is no need to either construct a new wired infrastructure or substantially modify a wired infrastructure that has been constructed for a different purpose.

In order to conserve scarce spectrum, the data communication devices of a point to multipoint wireless communication system may share access to a common frequency. In a typical scenario a first group of one or more frequency channels are allocated to downstream broadcast communication from a central access point to a plurality of subscriber units. A second group of one or more separate frequency channels are allocated to upstream communication from the subscriber units to the central access point. For upstream communication there is a medium access control (MAC) protocol that determines which subscriber unit is permitted to transmit at which time so as not to interfere with transmissions from other subscriber units.

For a given upstream frequency, the time domain is divided into frames that are typically of equal duration. Each frame represents an individually allocable unit in the time domain. One subscriber unit transmits in each frame. Reservations for transmission in a particular frame are made by the central access point and distributed in broadcast downstream transmissions. Such a scheme is referred to as a time domain multiple access scheme (TDMA).

In such a point to multipoint wireless communication system, it is generally preferable to centrally control the transmission power of each subscriber unit. Each subscriber unit should transmit at a power sufficient to ensure accurate reception of its transmission yet not so high so as to overload the front end of the central access point's receiver or cause interference to unintended receivers. Power control involves monitoring subscriber unit transmitted power at the central access point and sending power adjustment information downstream to maintain power at the desired level.

Cable modem systems also require access to a shared medium and subscriber unit power control. It would be desirable to simply adopt a MAC protocol already developed for cable applications to the wireless context. One such protocol that has been developed is referred to as the MCNS protocol. The MCNS protocol is described in the Data-over-Cable Service Interface Specifications, Radio Frequency Interface Specification, SP-RFI-I04-980724, (Cable Television Laboratories, 1997), the contents of which are herein incorporated by reference.

A cable MAC layer like MCNS is already implemented in low cost chip sets. The operational characteristics of MCNS are well known. Furthermore, it is desirable to maintain parts commonality between wireless modems and cable modems to the extent possible.

The MCNS protocol provides for controlling the power of subscriber units. In one implementation, the power control function is combined with monitoring of the round trip propagation delay between the central access point and individual subscriber units. Periodically, the head end sends a ranging request message to a particular subscriber unit. In response to the ranging request message, the subscriber unit sends a ranging response to the central access point. The time of the response indicates the subscriber unit's current understanding of the system clock as modified by the propagation delay. The head end then tells the subscriber unit by how much to adjust its clock phase to align its transmissions to the system MAC layer clock maintained by the head end. The head end also measures the power level of the ranging response message. Also, the head end sends the subscriber unit power adjustment information to help the subscriber unit set its power so that it will be received at a desired level.

This combined ranging and power control operation is, however, relatively infrequent, occurring approximately every two seconds in typical implementations. This MAC layer power control operation cannot easily be made more frequent because of the limited processing power provided by equipment implementing the MCNS protocol. In a wireless system, the frequency of power control operations that may be implemented practically with MCNS is insufficient. Channel response may vary too rapidly for the MCNS power control system to react. If hundreds of milliseconds have passed since the last update to the subscriber unit's power level, new data transmitted by the subscriber unit may be included in a transmission having an either excessive or insufficient power level.

One solution is to measure at the central access point the power of other subscriber unit transmissions such as data transmissions, access request transmissions and/or special power measurement transmissions. Such techniques are not admitted prior art to the present application and are discussed in the co-filed, co-assigned applications entitled POLLING FOR TRANSMISSION POWER CONTROL and OPTIMAL USE OF REQUEST ACCESS TDMA SLOTS FOR AUTOMATIC LEVEL CONTROL.

It is desirable to base power control on power level measurements obtained from disparate types of upstream transmissions that may occur at irregular intervals. For example, consider a voice over IP application where the network is supporting a voice telephone call made from a subscriber unit location. Upstream data transmissions from the participating subscriber unit will be relatively frequent and power measurements based on successive data transmissions will be up to date for the duration of the call. However, when a subscriber unit has been inactive for a long time the most recent power measurement may be based on a very old transmission. What is needed is a power control technique that can optimally exploit power measurements that occur at irregular intervals.

SUMMARY OF THE INVENTION

Improved adjustment of transmission power in a communication system is provided by virtue of the present invention. In one embodiment, in a point to multipoint communication system, transmission power of a subscriber unit is controlled based on power measurements made at a central access point. According to the present invention, power measurement information based on transmissions occurring at irregular intervals may be combined in a beneficial manner to control transmission output power. In one embodiment, a power regulation process determines a series of difference values indicating the differences between desired received power level at the central access point and measured received power level. A smoothing process is applied to the difference values. One or more parameters of the smoothing process vary with elapsed time since a last power measurement.

A first aspect of the present invention provides apparatus for operating a central access point in a point to multipoint communication system. The apparatus includes a receiver system that receives a series of transmissions from a subscriber unit and measures received power levels of the series of transmissions. The apparatus further includes a control processor that sends power adjustment information to the subscriber unit to regulate output power level of the subscriber unit. Influence of older ones of the received power levels on the output power level varies with elapsed time since the last one of the series of transmissions.

A second aspect of the present invention provides apparatus for operating a subscriber unit in a point to multipoint communication system. The apparatus includes a transmitter system that transmits a series of transmissions from the subscriber unit to a central access point. The apparatus further includes a control processor that regulates transmitted power level of the series of transmissions in accordance with power measurements made on the series of transmissions. The influence of older ones of said power measurements on the transmitted power level varies with the elapsed time since a most recent one of the power measurements.

Further understanding of the nature and advantages of the invention herein may be realized by reference to the remaining portions of the specification and the attached drawings.

DESCRIPTION OF SPECIFIC EMBODIMENTS

Figure 1:
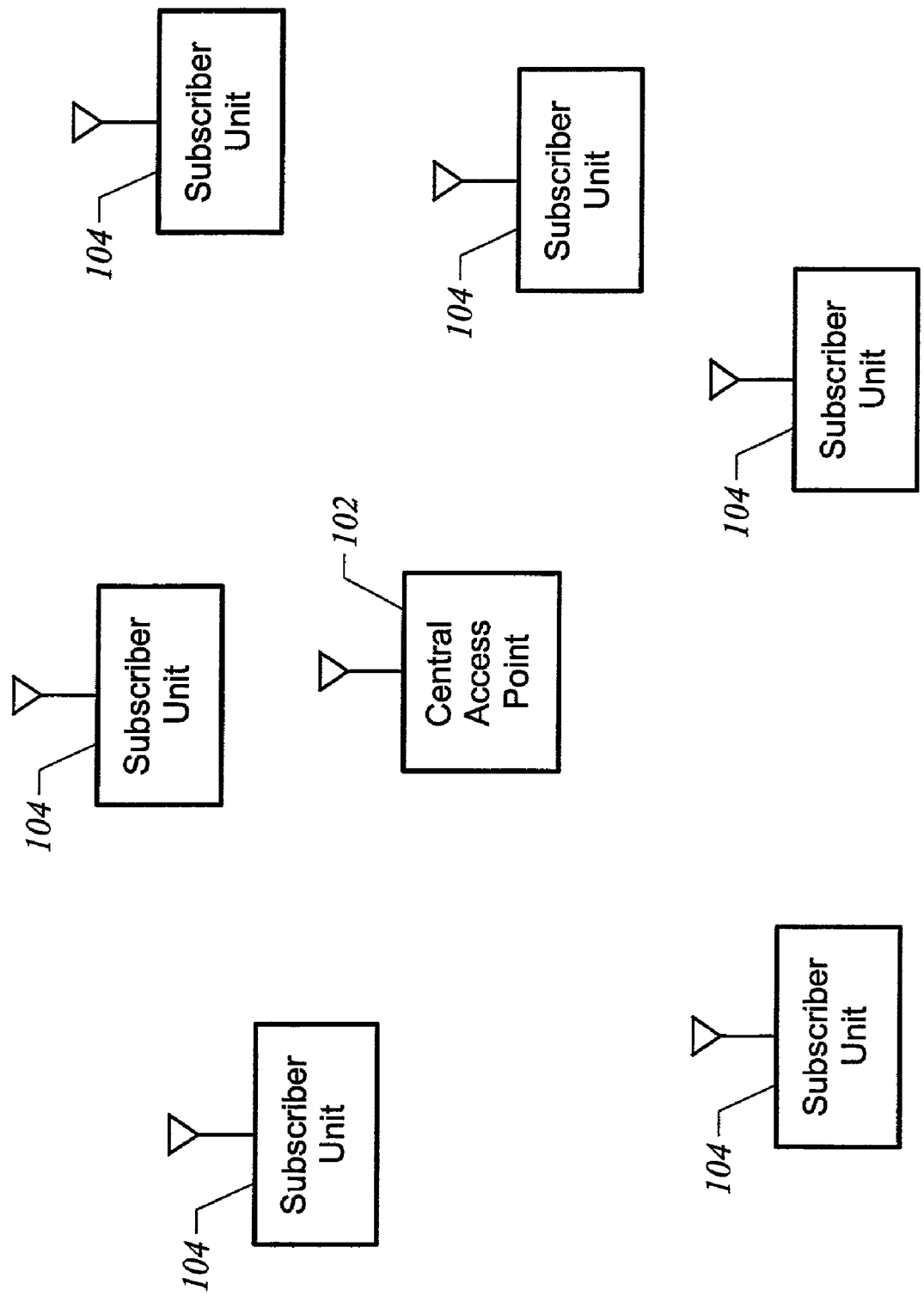
FIG. 1 depicts a point to multipoint communication system according to one embodiment of the present invention.

FIG. 1 depicts a point to multipoint wireless communication network 100 suitable for implementing one embodiment of the present invention. Network 100 includes a central access point or head end 102 and multiple subscriber units 104. All communication is typically either to or from central access point 102. Communication from central access point 102 to one or more subscriber units 104 is herein referred to as downstream communication. Communication from any one of subscriber units 104 to central access point 102 is herein referred to as upstream communication. In one embodiment, different frequencies are allocated to upstream and downstream communication. In alternate embodiments, subscriber units 104 may communicate directly with one another.

Each of one or more upstream frequencies is common to multiple subscriber units. To prevent collisions between subscriber units when accessing the shared medium, a medium access control (MAC) protocol is provided. According to one embodiment of the present invention, a MAC protocol developed for data transmission over cable systems may be used to coordinate upstream communications in wireless network 100. An exemplary MAC protocol of this type is the so-called MCNS protocol described in the Data-over-Cable Service Interface Specifications, Radio Frequency Interface Specification, SP-RFI-I04-980724, (Cable Television Laboratories, 1997).

MCNS employs a time domain multiple access (TDMA) scheme to allocate access to the shared upstream frequency among multiple subscriber units 104. The entities controlling operation according to the MAC protocol at central access point 102 and subscriber units 104 are referred to collectively as the MAC layer. This identifies these entities as representing a layer in a multi-layer communication model. In reference to the well-known OSI multi-level model of data communications, the MAC layer as it is discussed here corresponds to a lowest sublayer of the data link layer. Underneath the MAC layer is the physical layer, which is responsible for transmitting and receiving bits over the wireless channel. The MAC layer implements a TDMA scheme for upstream communication. Each of one or more frequencies is divided into a series of frames or minislots in the time domain.

Figure 2:
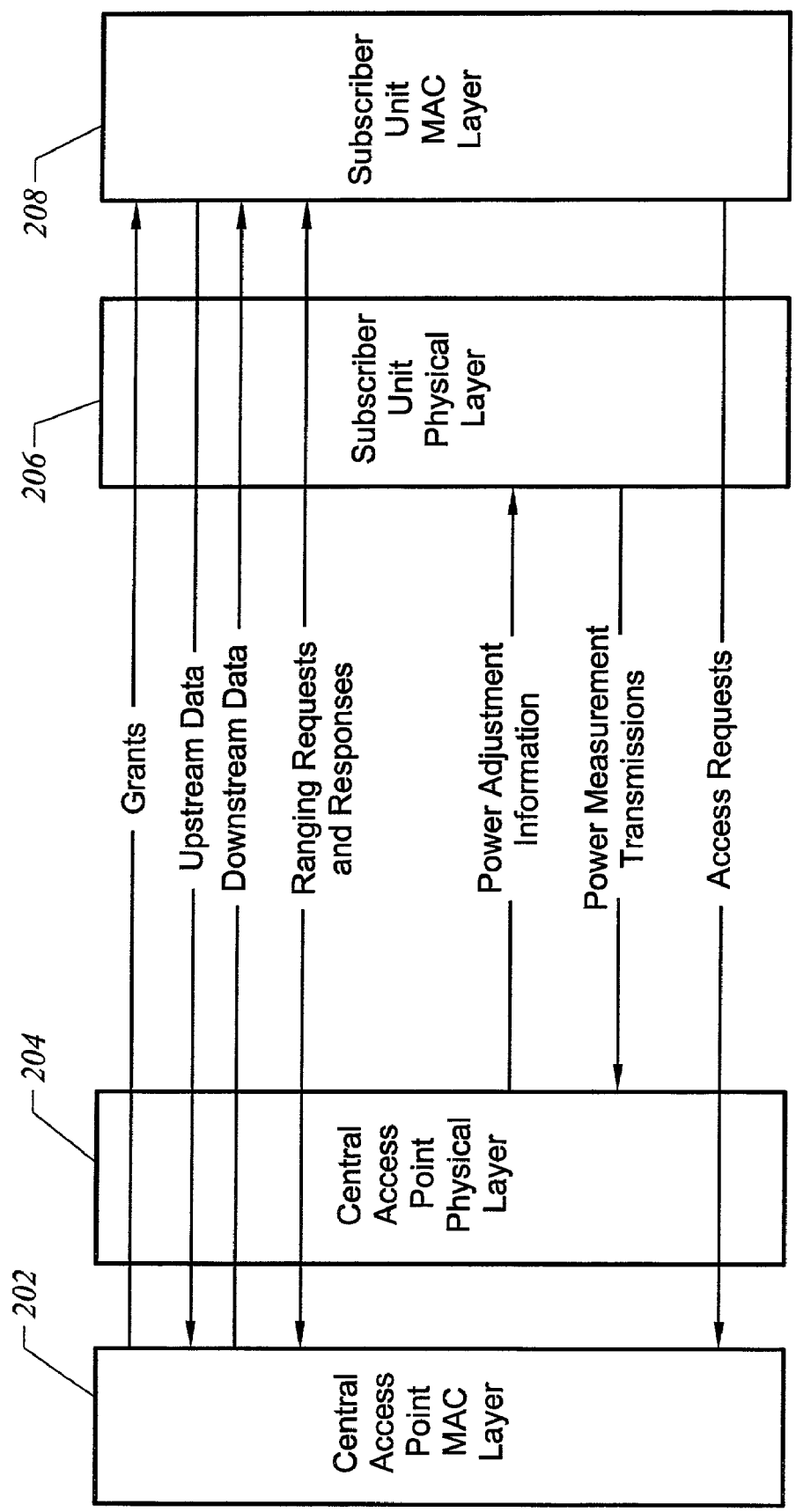
FIG. 2 depicts the interchange of messages between physical layer and MAC layer entities at a subscriber unit and a central access point according to one embodiment of the present invention.

FIG. 2 depicts interactions between central access point 102 and one of subscriber units 104. Central access point 102 includes a central access point MAC layer block 202 and a central access point physical layer block 204. Subscriber unit 104 includes a subscriber unit physical layer block 206 and a subscriber unit MAC layer block 208. In one embodiment, central access point MAC layer block 202 and subscriber unit MAC layer block 208 collectively operate according to the MCNS protocol.

Data from higher layers and MAC layer network management information are passed between MAC layer block 202 and 208 via physical layer blocks 204 and 206 which are directly responsible for exchange of bits across the wireless channel. Central access point 102 has exclusive access to at least one frequency for downstream transmissions. Subscriber unit 104, however, shares access to one or more upstream transmission frequencies in accordance with the operative MAC protocol.

Each subscriber unit 104 is assigned one or more MAC layer addresses. In MCNS applications, the MAC layer addresses are known as SIDs. Multiple SIDs are assigned to individual data services at a subscriber unit. For example, voice traffic at a particular subscriber unit may be designated by a given SID with other types of data being assigned a different SID. The various SID values may be assigned when a subscriber unit powers on and registers to the central access point. Each subscriber unit has a primary SID that uniquely identifies the subscriber unit.

One class of network management messages exchanged between central access point MAC layer block 202 and subscriber unit MAC layer block 208 implements ranging, the process of establishing the round trip propagation delay between central access point 102 and subscriber unit 104. There are ranging requests transmitted from central access point MAC layer block 202 to subscriber unit MAC layer block 208 and ranging responses sent back from subscriber unit MAC layer block 208 to central access point MAC layer block 202. The power level of the ranging responses may be measured within central access point physical layer block 204. Central access point MAC layer block 202 and subscriber unit MAC layer 208 also act as data interfaces to higher layers.

Application data including, e.g., voice, video, computer files, etc. is exchanged between the MAC layer blocks. Higher layer entities serve as the origin and destination for this data. When subscriber unit MAC layer block 208 has application data ready for upstream transmission to central access point MAC layer block 202, it transmits a special network management message known as an access request (RA). TDMA-oriented MAC layer protocols such as MCNS allocate certain time domain slots for transmission of access requests. In response to access requests, central access point MAC layer block 202 sends grants downstream to the various subscriber units 104. A downstream grant message includes SIDs for various subscriber unit data services accompanied by times reserved for their upstream transmission of data.

Point to multipoint communication system 100 regulates the transmission power level of each subscriber unit 104 so that the received power is at a desired level. The desired received power level may be set the same for each subscriber unit 104. The desired received power level may be set at a level high enough to assure accurate reception of data by central access point 102 while not being set so high so as to saturate receiver equipment within central access point 102 or cause interference to unintended receivers.

To regulate power to the desired level central access point 102 measures the received power level from each of subscriber units 104. A received power level may be measured on each type of upstream transmission depicted in FIG. 2. According to the present invention, power control may be based on power measurements made on disparate types of transmissions arriving at central access point 102 at disparate times.

Figure 3A:
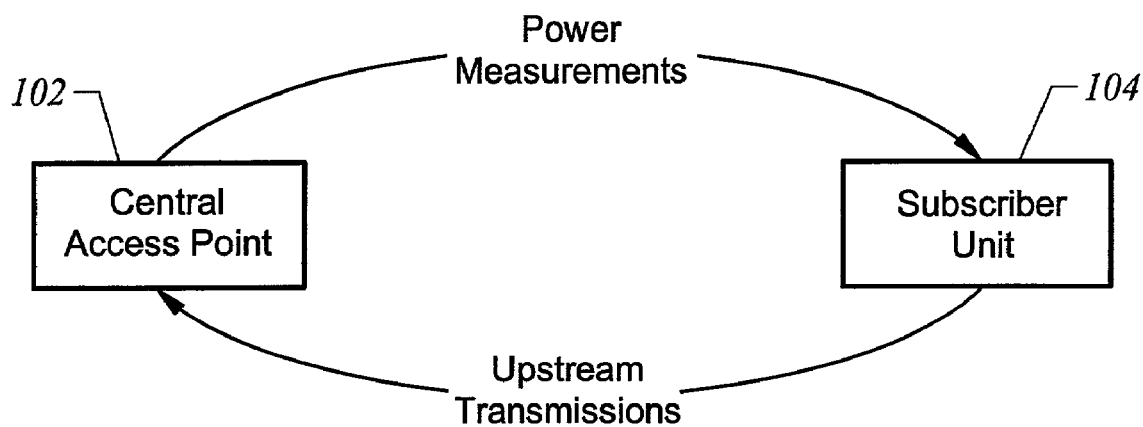
FIGS. 3A–3D depict alternative operation schemes of a power control loop according to one embodiment of the present invention.

FIGS. 3A–3D illustrate message traffic relating to power control and various alternative divisions of power control responsibilities between central access point 102 and subscriber unit 104. Methods for determining transmitter power level will be described with reference to FIGS. 6A–6B. In FIG. 3A, central access point 102 makes successive power measurements on upstream transmissions received form subscriber unit 104. Central access point 102 sends information indicating the raw power measurement levels back to subscriber unit 104.

Figure 3B:
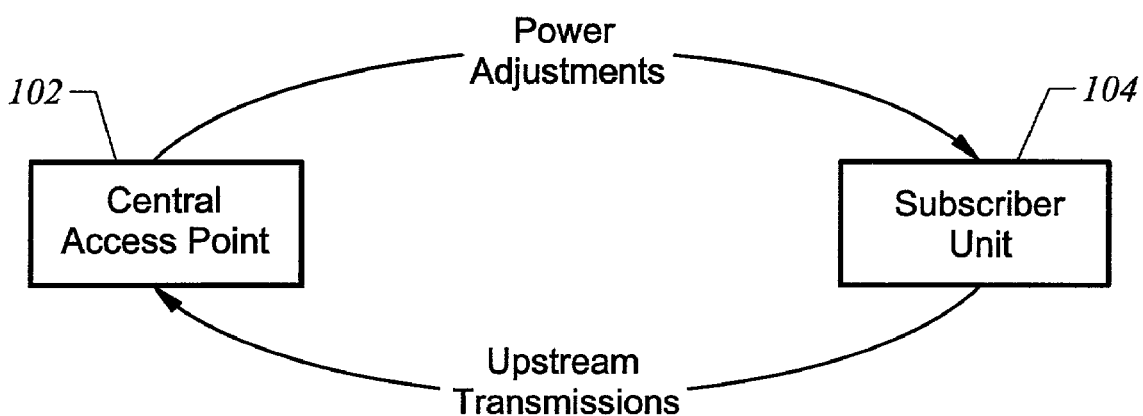

In FIG. 3B, central access point 102 determines the desired power adjustment for subscriber unit 104 based on received power measurements. Central access point 102 sends power adjustments downstream to subscriber unit 104. In one embodiment, subscriber unit 104 smoothes the adjustment amounts received over time to obtain a smoothed adjustment to actually use in modifying transmit power. Alternatively, subscriber unit 104 simply modifies its output power in response to the adjustments.

Figure 3C:
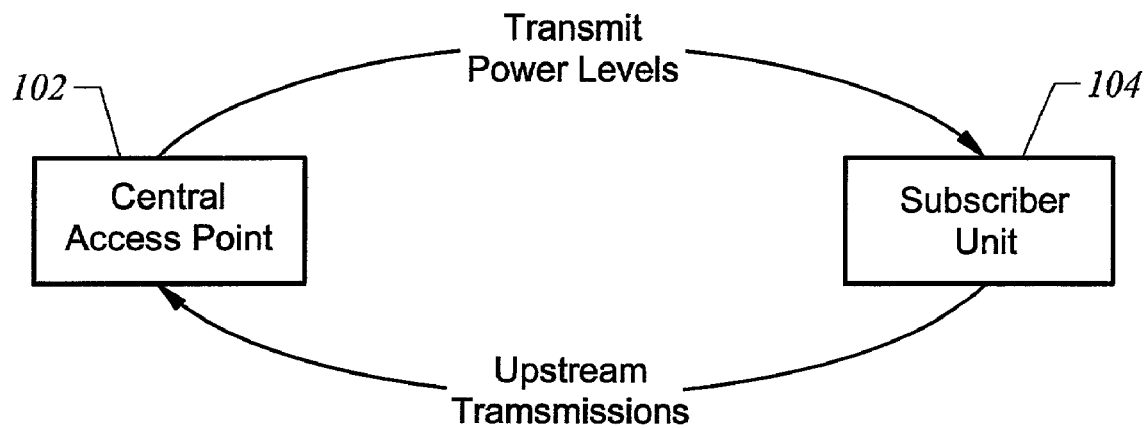

In FIG. 3C, central access point 102 determines the desired transmission power levels for subscriber unit 104 based on received power measurements. Central access point 102 sends these levels downstream to subscriber unit 104. In one embodiment, subscriber unit 104 smoothes the power levels over time before using them. Alternatively, subscriber unit 104 simply changes its output power to the level indicated in the downstream transmission.

Figure 3D:
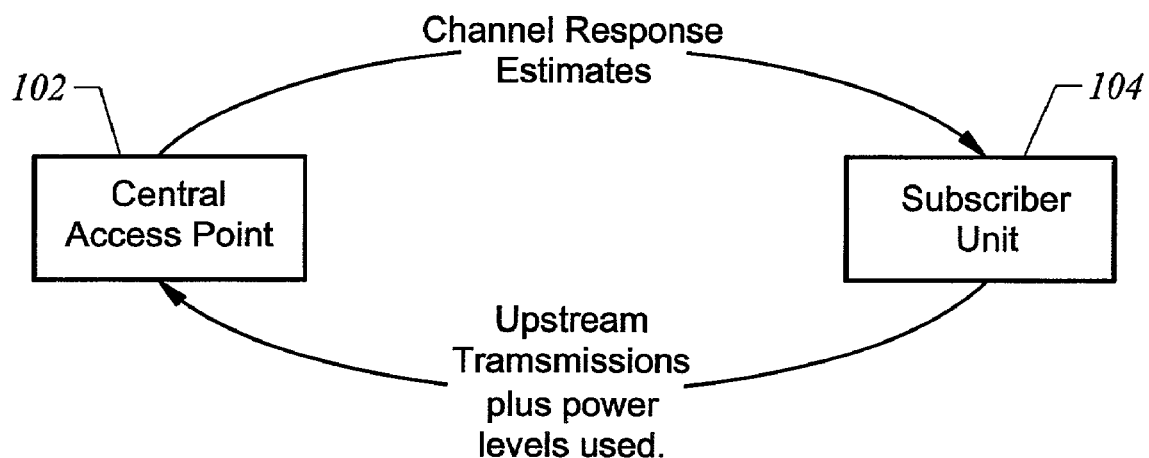

In FIG. 3D, the upstream transmissions used for power measurements include a numeric value indicating the power level used for the transmission. The numeric value is embedded as data in the upstream transmissions. Central access point 102 may then estimate a channel response magnitude by dividing the power measurement for a particular transmission by the transmitter power level. Channel response estimates derived from successive transmissions are then sent downstream to subscriber unit 104.

Figure 4:
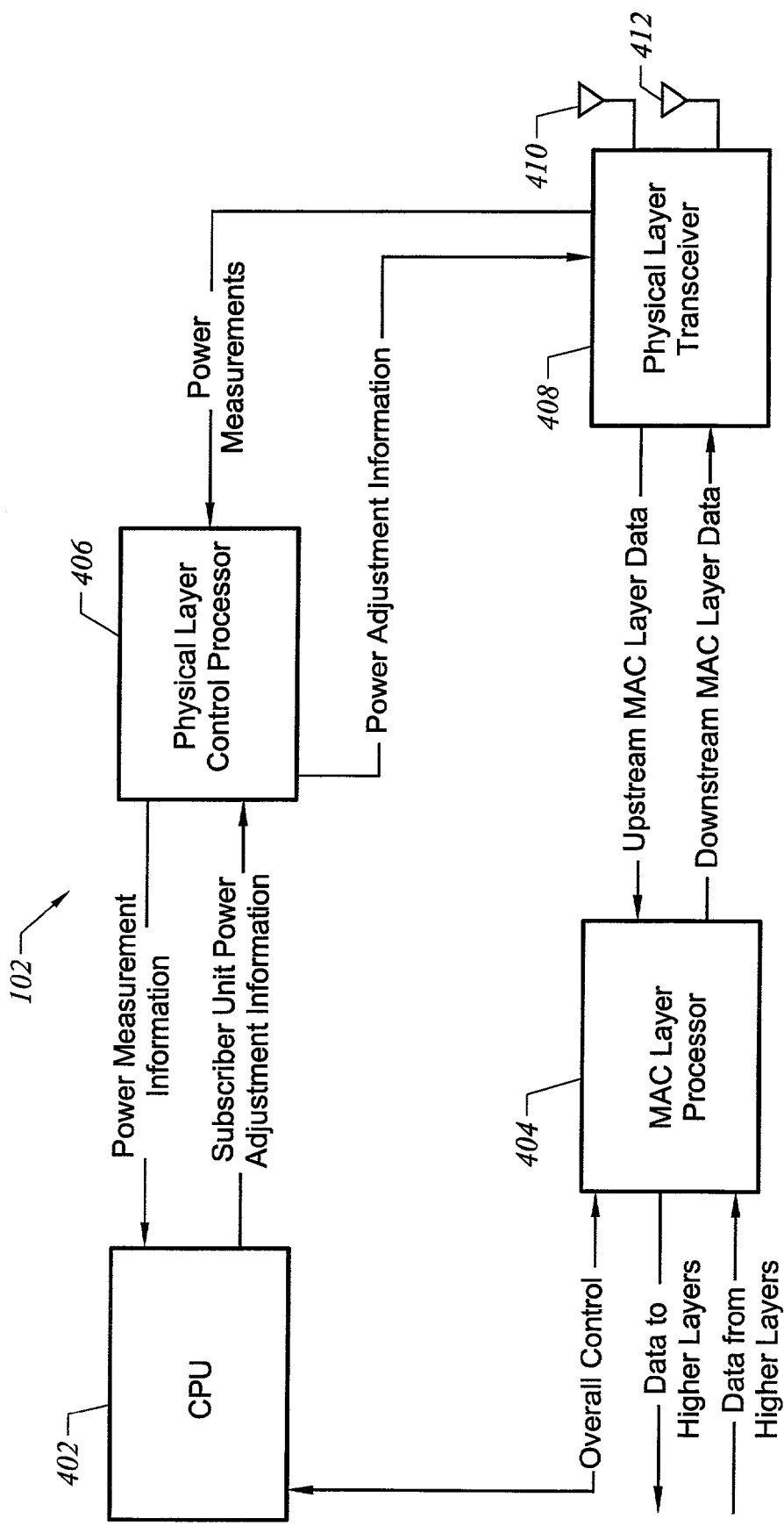
FIG. 4 depicts elements of a central access point of a point to multipoint communication system according to one embodiment of the present invention.

FIG. 4 depicts elements of central access point 102 according to one embodiment of the present invention. Central access point 102 includes a CPU 402 that controls overall operation. A MAC layer processor 404 is primarily responsible for controlling MAC layer functions and serving as an interface to higher layer entities. MAC layer processor 404 controls the transmission and reception of messages shown in FIG. 2 as being transmitted or received by central access point MAC layer block 202. In one embodiment, central access point MAC layer processor 404 may be a BCM3210B integrated circuit available from Broadcom, Inc. of Irvine Calif. Central access point physical layer block 204 is depicted as including a physical layer control processor 406 and a physical layer transceiver 408. Physical layer transceiver 408 is equipped with a transmitter antenna 410 and a receiver antenna 412. In one embodiment, CPU 402 also incorporates the functions of physical layer processor 406 and/or MAC layer processor 404.

Physical layer transceiver 408 includes a modem for converting received analog signals to digital data and for converting digital data to be transmitted to analog signals. Physical layer transceiver 408 also incorporates necessary RF and IF subsystems both for upconverting analog transmitter signals to RF frequency and downconverting received RF signals to baseband. Physical layer transceiver 408 also incorporates hardware for measuring power of individual transmissions from subscriber units. These power measurements are forwarded to physical layer control processor 406.

The primary source of digital transmission data for physical layer transceiver 408 is the downstream MAC layer data and higher layer data forwarded by MAC layer processor 404. Also, however, there is power adjustment information to be sent downstream that is received from physical layer control processor 406. As was described in reference to FIGS. 3A–3D, the power adjustment information may be, e.g., power adjustment commands, raw power measurements, channel estimates, etc. Physical layer transceiver 408 sends this power adjustment information downstream in a manner that is transparent to MAC layer operation. One scheme for downstream transmission of this power adjustment information is described in the co-filed co-assigned application entitled COMMUNICATION OF PHYSICAL LAYER CONTROL PARAMETERS.

Physical layer control processor 406 receives power measurements from physical layer transceiver 408 from various subscriber units and formats the information for forwarding to CPU 402. Physical layer control processor 406 determines power adjustment information based on these power measurements and sends the power adjustment to physical layer transceiver 408 for downstream transmission. As is shown in FIG. 4, CPU 402 may also perform the determination of power adjustment information. The functionality of CPU 402, physical layer control processor 406, and MAC layer processor 404 may be, e.g., combined in one unit of divided in any way among multiple units.

In the embodiment of FIG. 3A, the power adjustment information developed by physical layer control processor 406 consists of the raw power measurements. In the embodiment of FIG. 3B, the power adjustment information includes power adjustment values. Physical layer control processor 406 then computes the power adjustments to send downstream in decibels. In the embodiment of FIG. 3C, the power adjustment information includes the power transmission level to be used by subscriber unit 104.

In the embodiment of FIG. 3D, from each transmission having its power measured, physical layer transceiver 408 also extracts a data value corresponding to the output transmission power level used by the subscriber unit. Physical layer control processor 406 then estimates the channel response magnitude by dividing the measured received power by the subscriber unit transmission power level value. The power adjustment information sent downstream then consists of these channel response magnitude values.

In many systems, there may be limited capacity available to send power adjustment information downstream to numerous subscriber units. Physical layer control processor 406 may maintain a FIFO queue (not shown) of power adjustment information data items awaiting downstream transmission to subscriber units. The power adjustment information data items are the raw power measurements, power adjustment values, requested transmission power levels, or channel estimates, etc. shown in FIGS. 3A–3D. Each such data item is identified in the queue by a MAC layer address of a particular subscriber unit. In an MCNS application, the MAC layer address may be the primary SID assigned to the particular subscriber unit.

New power adjustment information for a particular subscriber unit may be generated by physical layer control processor 406 before previously generated power adjustment information has been transmitted downstream and removed from the queue. The previously generated power adjustment information is thus now obsolete and should not be transmitted downstream. In one embodiment, when new power adjustment information for a particular subscriber unit is ready for transmission downstream, physical layer control processor 406 checks whether that subscriber unit already has an entry in the queue. If there is no entry in the queue, the new power adjustment information is written to the back of the queue. If there is a previous untransmitted entry in the queue, the new power adjustment information overwrites the old entry and assumes the old entry's position in the queue.

Figure 5:
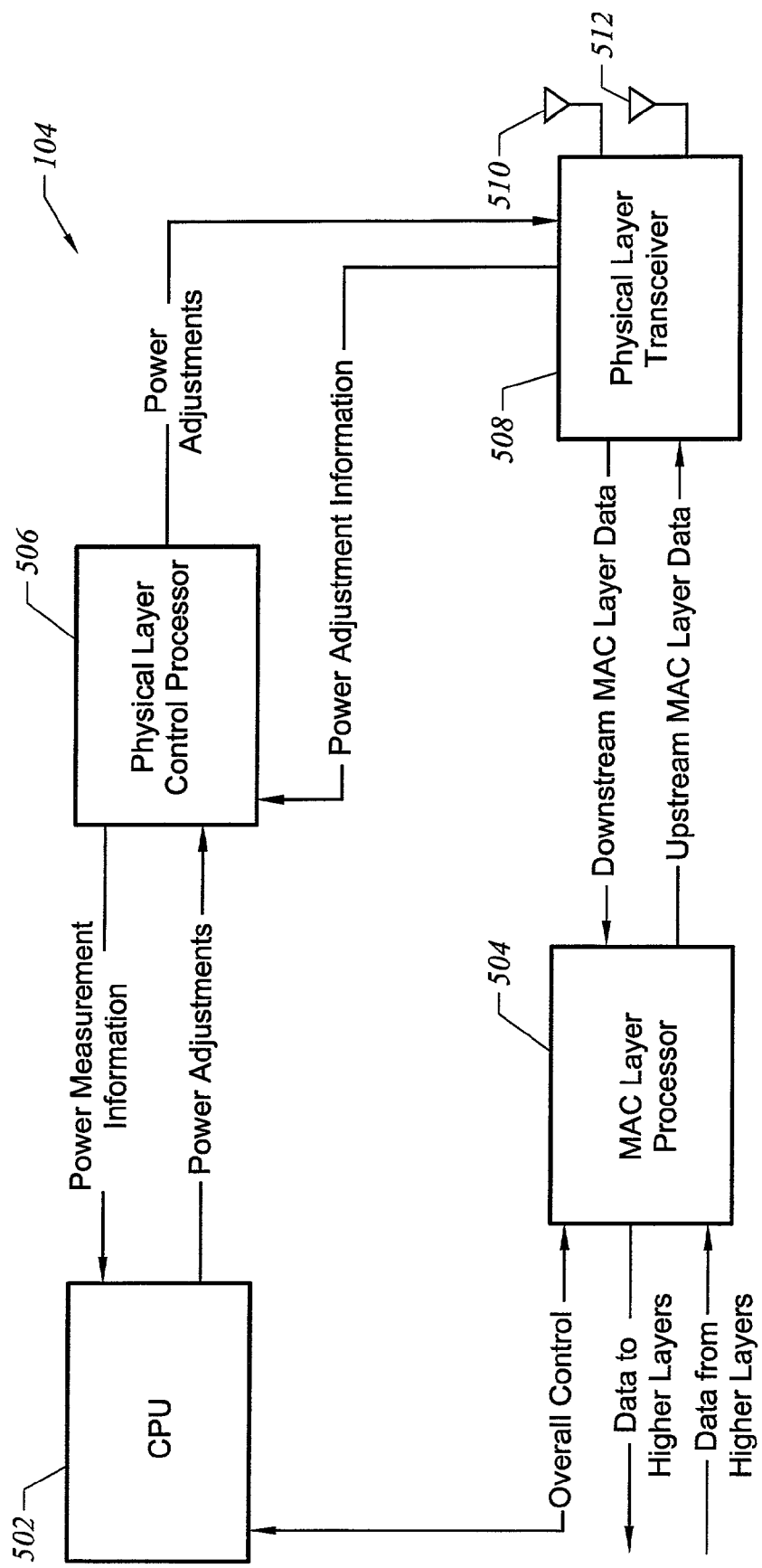
FIG. 5 depicts elements of a subscriber unit of a point to multipoint communication system according to one embodiment of the present invention.

FIG. 5 depicts elements of a representative subscriber unit 104 according to one embodiment of the present invention. A CPU 502 is responsible for overall control. A MAC layer processor 504 substantially implements the functionality of subscriber unit MAC layer block 208. MAC layer processor 504 also acts as a data interface to higher layers. In an MCNS embodiment, MAC layer processor 504 may be a BCM3300 integrated circuit provided by Broadcom.

A physical layer control processor 506 and a physical layer transceiver 508 together implement the functionality of subscriber unit physical layer block 206 shown in FIG. 2. Physical layer transceiver 508 is equipped with a transmitter antenna 410 and a receiver antenna 512. Physical layer transceiver 508 includes a modem for transforming digital data into analog modulated signals for transmission and for transforming received modulated analog signals into digital data. Physical layer transceiver 508 also incorporates an RF receiver system for downconverting a received RF signal to a baseband signal while providing necessary filtering and amplification. Physical layer transceiver 508 also includes an RF transmitter system that upconverts baseband and provides necessary filtering and amplification. Physical layer transceiver 508 is capable of setting its output transmitter power level in response to power adjustment commands received from physical layer control processor 506. This may be done by varying RF amplification, IF (intermediate frequency) amplification, digital scaling, or a combination of these.

Physical layer transceiver 508 receives its digital data for transmission from MAC layer processor 504. Received digital data output by physical layer transceiver 508 is primarily MAC layer data and higher layer data which is forwarded to MAC layer processor 504. There is also power adjustment information, however, that is handled by the physical layer. This power adjustment information is forwarded to physical layer control processor 506. The reception of this power adjustment information in a way that is transparent to the MAC layer is discussed in the application entitled COMMUNICATION OF PHYSICAL LAYER CONTROL PARAMETERS.

In response to power adjustment information received from physical layer transceiver 508, physical layer control processor 506 determines a new transmitted power level that is forwarded to physical layer transceiver 508 for adjustment of transmitter output power. In one embodiment, as shown in FIG. 5, CPU 502 may determine the new transmitted power level instead of physical layer control processor 506. The functionality of CPU 502, physical layer control processor 506, and MAC layer control processor 504 may be, e.g., combined in one unit or divided among multiple units in any way.

Figure 6A:
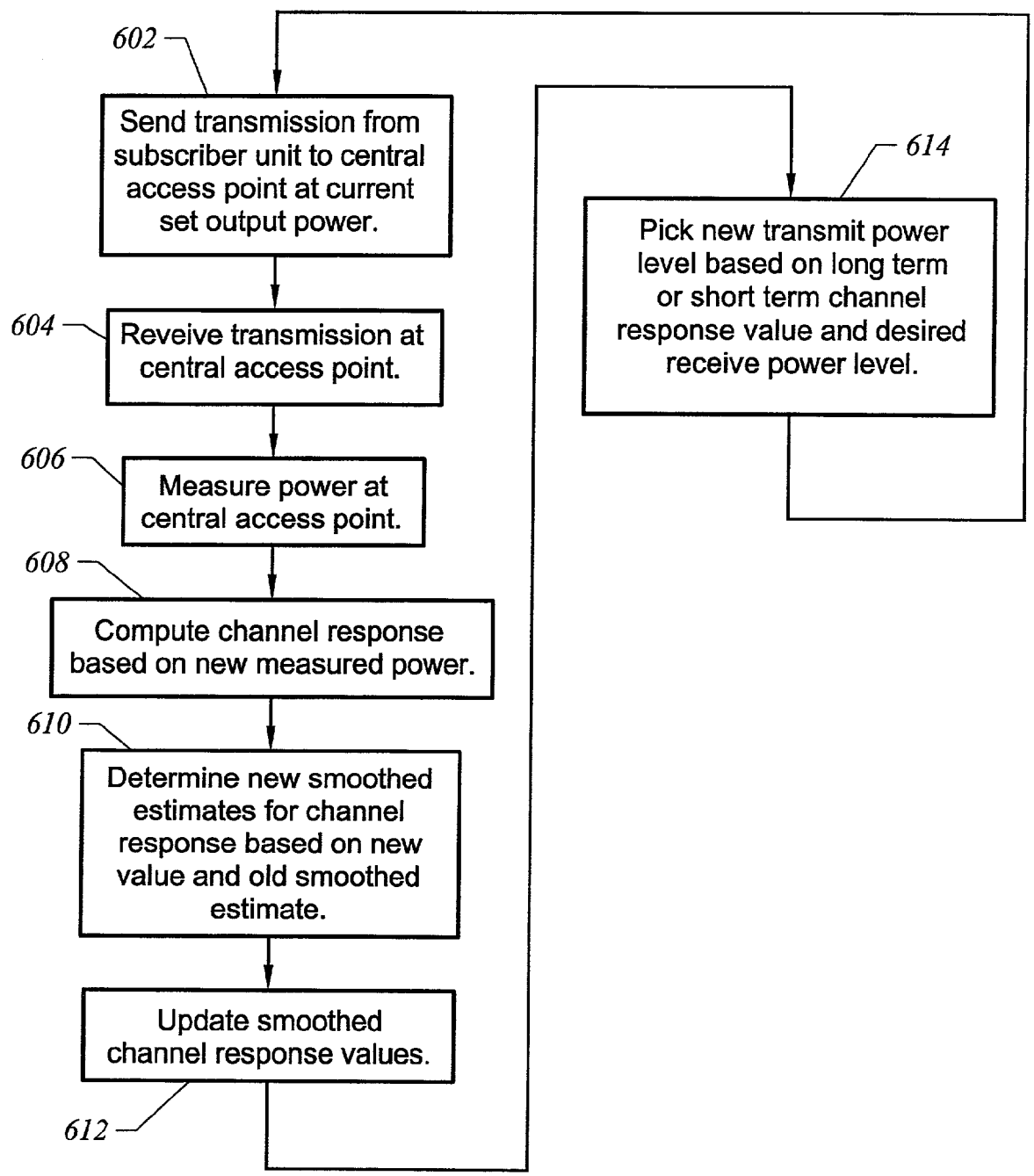
FIG. 6A is a flowchart describing steps of controlling subscriber unit output power in a point to multipoint communication system according to a first alternative embodiment of the present invention.
Figure 6B:
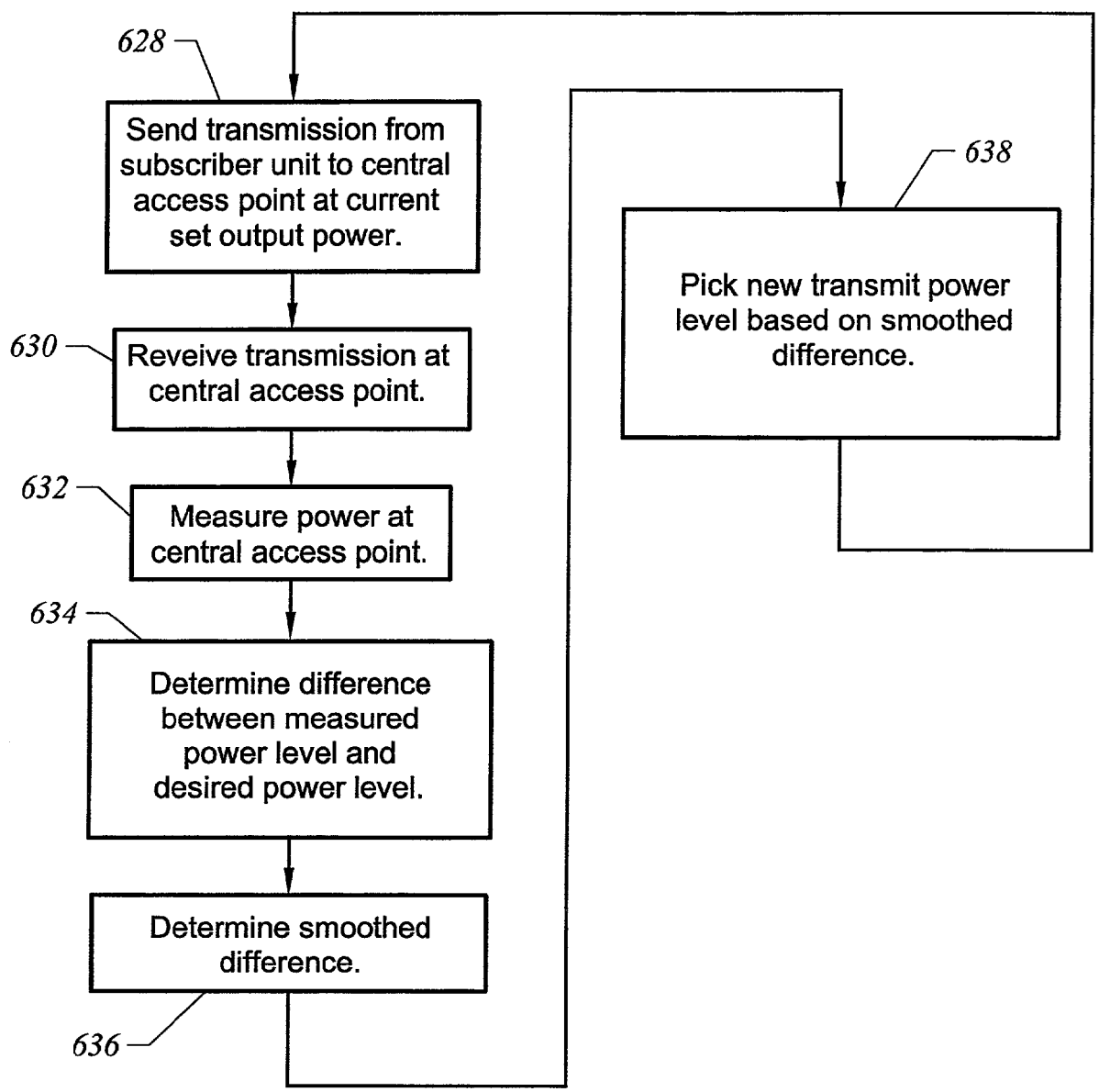
FIG. 6B is a flowchart describing steps of controlling subscriber unit output power in a point to multipoint communication system according to a second alternative embodiment of the present invention.

For the embodiment of FIGS. 3A, physical layer control processor 506 may adjust power in response to received raw measurements using, e.g., the techniques of either FIG. 6A or FIG. 6B. If the technique of FIG. 6A is used in conjunction with the embodiment of FIG. 3A, physical layer control processor 506 will preferably maintain previously used power levels to assist in estimating channel responses. For the embodiment of FIG. 3B, physical layer control processor 506 may, e.g., directly adjust transmit power in response to received adjustment values or smooth the adjustment values as described in reference to FIG. 6B. For the embodiment of FIG. 3C, physical layer control processor 506 may, e.g., simply use the power level values transmitted by central access point 102 or apply smoothing along the lines described in reference to FIG. 6B. For the embodiment of FIG. 3D, physical layer control processor 506 may determine the power adjustment using, e.g., the technique of FIG. 6A.

In processing received power adjustment information, physical layer control processor 506 should take into account delays in processing power adjustment information at central access point 102 and in sending that information downstream. This may mean that a portion of the power adjustment information will be obsolete once received by subscriber unit 104. In one embodiment, physical layer control processor 506 will discard all power adjustment information received less than a time, q, after the most recent updated power level. The discarded information is assumed to not reflect the new power level. In one embodiment, q is 20 milliseconds.

FIGS. 6A–6B illustrate exemplary methods of power regulation. FIG. 6A depicts steps of power regulation wherein a smoothed estimate of the channel response is developed as a weighted sum of a previous smoothed estimate and a new instantaneous channel response value. At step 602, subscriber unit 104 sends central access point 102 a transmission at the current output power level. The transmission may be, e.g., a special measurement transmission, a data transmission, a ranging response transmission, or any type of network management transmission. Power regulation may be based on measurements made on all kinds of upstream transmissions from subscriber unit 104 or only on selected kinds of upstream transmissions. At step 604, central access point 102 receives this transmission. At step 606, central access point 102 measures the power of the transmission.

At step 608, the power regulation process determines a new instantaneous channel response based on the measured power by dividing the measured received power level by the known power level used for transmission. Step 610 determines new long term and short term smoothed estimates for the channel response that take into account both the new instantaneous value determined at step 608 and previous channel response values.

The new long term smoothed channel response value is $\hat{g}_1(k)$ where $$\hat{g}_1(k) = \beta_1 \hat{g}_1(k-1) + (1-\beta_1)\frac{P(k)}{S(k)},$$

and $$\beta_1 = e^{-\Delta t/T_1}$$

The new short term smoothed channel response value is $\hat{g}_2(k)$ where $$\hat{g}_2(k) = \beta_2 \hat{g}_2(k-1) + (1-\beta_2)\frac{P(k)}{S(k)},$$

and $$\beta_2 = e^{-\Delta t/T_2}$$

where k identifies a particular upstream transmission, P(k) identifies the received power level for that transmission, S(k) identifies the subscriber unit transmission power level used for that transmission, and Δt identifies time since the last update of the smoothed estimates.

In a representative embodiment where the fading bandwidth (i.e., the 3 dB bandwidth of a signal representing the channel response variation over time) is assumed to be 10 Hz, $T_1$ is 10 seconds, and $T_2$ is 100 milliseconds. The smoothed estimates are updated to their new values at step 612.

At step 614, the power regulation process picks the new transmit power level based on the desired received power level and one of the smoothed channel response estimates. The short term channel response value is used when the last power measurement is recent. The new transmit power level is then $$S(k+1) = \frac{P_{des}}{\hat{g}_2(k)}$$

where $P_{des}$ is the desired received power level.

The long term channel response value is used when the last power measurement is not recent. The new transmit power level is then $$S(k+1) = \frac{P_{des}}{\hat{g}_1(k)}.$$

In the 10 Hz fading bandwidth example, the threshold for selecting between the long term and short term fading bandwidth is 100 milliseconds. When the last measurement occurred more than 100 milliseconds ago, the long term channel response value is used. When the last measurement occurred less than 100 millisconds ago, the short term channel response value is used.

For the embodiment of FIG. 3A, steps 608 through 614 are performed at subscriber unit 104. For the embodiment of FIG. 3C, central access point 102 performs steps 608 through 614. For the embodiment of FIG. 3D, central access point 102 performs step 608. Depending on whether raw or smoothed channel estimates are transmitted downstream to subscriber unit 104, either central access point 102 or subscriber unit 104 may perform steps 610 and 612. Subscriber unit 104 then performs step 614.

FIG. 6B is a flowchart describing steps of regulating power based on determining a difference between measured received power and desired received power. At step 628, subscriber unit 104 sends a transmission upstream to central access point 102 using the currently set output power. At step 630, central access point 102 receives the transmission. At step 632, central access point 102 measures the power level of the received transmission. At step 634, the power regulation process determines a difference between the measured power level and a desired power level.

At step 636, the power regulation process applies a smoothing function to the difference value determined in step 634. The smoothing function may be:

$$\hat{d}(k) = \beta \hat{d}(k-1) + (1-\beta)d(k)$$

where k is a time index value, d(k) is a new instantaneous power difference level as determined at step 634, and $\hat{d}(k)$ is a smoothed estimate of the power difference. In one embodiment, the quantity β is equivalent to A−B*Δt where Δt is a time since the last power level update. In a representative embodiment, A=0.6 and B=0.1/(100 milliseconds). If, however, Δt is greater than 600 milliseconds, β=0. In an alternative embodiment, separate short term and long term smoothed difference estimates are maintained.

At step 638, a new transmit power level is selected based on the smoothed difference value. In one embodiment, the smoothed differences are integrated to develop the new subscriber unit power level. The new subscriber unit power level may be:

$$S(k+1) = S(k) + \alpha \ast \bar{d}(k)$$

where $\alpha = C \ast \Delta t + D$. In one embodiment, C and D vary depending on whether $\Delta t$ is above or below a threshold. In a particular example where the fading bandwidth=10 Hz, for $\Delta t < 125$ milliseconds, $C=0.7/(125$ milliseconds$)$ and $D=0$. For $\Delta t \geq 125$ milliseconds, $C=0.2/(125$ milliseconds$)$ and $D=0.5$.

For the embodiment of FIG. 3A, steps 634, 636, and 638 will be performed by subscriber unit 104. For the embodiment of FIG. 3B, step 634 would be performed by central access point 102. Step 636 could be performed by either one of central access point 102 or subscriber unit 104, step 638 would be performed by subscriber unit 104. For the embodiment of FIG. 3C, steps 634 through 638 would all be performed by central access point 102.

According to the present invention, another alternative technique is to maintain short term average and long term average power measurements and use one of them as the basis for further power adjustment computations. For any of the techniques that rely on maintaining separate short term and long term values, the long term value is used if elapsed time since the last is above a threshold. The short term value is used if elapsed time since the last update is below the threshold.

Also, other filters, predictors, etc. may substitute for the smoothing and integration operations described above. For example, one may use the well-known Wiener filter to filter the power difference values. Using a predictor allows for future power adjustments to be predicted given past values of measurements. This may improve the accuracy of future transmissions when significant time has elapsed since the most recent measurement.

In a further alternative embodiment, long term power adjustment information, e.g., a long term channel response estimate is maintained by the MAC layer. The short term power adjustment information, e.g., a short term channel response estimate, is maintained independently by the physical layer. The short term channel response estimate is used to control output power of a new transmission if it is has been updated recently. Otherwise, the long term channel response estimate is used to control output power. The short term channel response estimate may be based on more power measurements than the long term estimate and may thus be updated more frequently than the long term estimate. This reduces the processing burden on the CPU and/or MAC layer processor that are responsible for maintaining the long term estimate.

The present invention is also not limited to the use of an elapsed time threshold to select smoothing or filtering parameters or to select between long term and short term power adjustment information as a basis for updating subscriber unit power level. For example, instead of elapsed time since a last available measurement or update operation, one may use a more complex measure taking into account the age of multiple recent measurements. One may also vary filtering parameters with elapsed time or some other measure of age of recent measurements.

It is understood that the examples and embodiments described herein are for illustrative purposes only and that various modifications or changes in light thereof will be suggested to persons skilled in the art and are to be included within the spirit and purview of this application and the scope of the appended claims. For example, the present invention may be applied to wireline systems. All publications, patents, and patent applications cited herein are hereby incorporated by reference.

The invention claimed is:

1. In a communication system, a method for operating a first node comprising:
   receiving a series of transmissions from a second node;
   measuring received power levels of said series of transmissions; and
   sending power adjustment information to said second node to regulate output power level of said second node, wherein each of said received power levels influence said output power level and influence of older ones of said received power levels on said output power level varies with elapsed time since a last one of said series of transmissions.

2. The method of claim 1 further comprising:
   estimating a long term average power adjustment indicator and a short term average power adjustment indicator based on said received power levels.

3. The method of claim 2 wherein said long term average power adjustment indicator is maintained by a MAC layer and said short term average power adjustment indicator is maintained by a physical layer.

4. The method of claim 2 wherein sending comprises:
   maintaining a FIFO queue of power adjustment information data items to be sent downstream from said first node; and
   if said queue already contains previous power adjustment information addressed to said second node, overwriting said previous power adjustment information with new power adjustment information.

5. The method of claim 4 wherein said power adjustment information addressed to said second node is identified by an MCNS primary subscriber ID of said second node.

6. The method of claim 1 further comprising:
   estimating a response of a channel from said second node to said first node based on said received power levels.

7. The method of claim 4 wherein said power adjustment information comprises said estimated channel response.

8. The method of claim 1 wherein said power adjustment information comprises differences between said received power levels as measured and desired received power levels.

9. The method of claim 1 wherein said communication system comprises a point to multipoint communication system, said first node comprises a central access point and said second node comprises a subscriber unit.

10. In a communication system, a method for operating a first node comprising:
    transmitting a series of transmissions from said first node to a second node; and
    regulating a transmitted power level of said series of transmissions in accordance with power measurements made on said series of transmissions wherein each of said power measurements has an influence on said transmitted power level and the influence of older ones of said power measurements on said transmitted power level varies with elapsed time since a most recent one of said power measurements.

11. The method of claim 10 wherein regulating comprises:
    receiving information indicating said power measurements from said second node.

12. The method of claim 10 wherein regulating comprises:
receiving information indicating channel responses estimated based on said power measurements from said second node.

13. The method of claim 12 wherein regulating further comprises estimating said transmitted power based on said channel responses and a desired received power level.

14. The method of claim 10 wherein regulating comprises:
receiving differences between power measurements made at said second node and desired received power levels for said second node.

15. The method of claim 14 wherein regulating further comprises:
smoothing said differences as received wherein influence of older received differences is greater when said elapsed time exceeds a threshold.

16. The method of claim 14 wherein regulating further comprises:
discarding differences received less than a predetermined time after a last upstream transmission.

17. The method of claim 10 where said communication system comprises a point to multipoint communication system, said first node comprises a subscriber unit and said second node comprises a central access point.

18. The method of claim 10 wherein transmitting comprises:
embedding a current power level within each of said series of transmissions.

19. In a communication system, apparatus for operating a first node comprising:
a receiver system that receives a series of transmissions from a second node and measures received power levels of said series of transmissions; and
a control processor that sends power adjustment information to said second node to regulate output power level of said second node, wherein each of said received power levels influences said output power level and influence of older ones of said received power levels on said output power level varies with elapsed time since a last one of said series of transmissions.

20. The apparatus of claim 19 wherein said control processor estimates a response of a channel from said second node to said first node based on said received power levels.

21. The apparatus of claim 20 wherein said power adjustment information comprises said estimated channel response.

22. The apparatus of claim 19 wherein said power adjustment information comprises differences between said received power levels as measured and desired received power levels.

23. The apparatus of claim 19 wherein said communication system comprises a point to multipoint communication system, said first node comprises a central access point and said second node comprises a subscriber unit.

24. The apparatus of claim 23 further comprising
a FIFO queue of power adjustment information data items to be sent downstream from said first node; and wherein
if said queue already contains previous power adjustment information addressed to said second node, said control process overwrites said previous power adjustment information with new power adjustment information.

25. The apparatus of claim 23 wherein said power adjustment information addressed to said second node is identified in said FIFO queue by an MCNS primary SID of said second node.

26. In a communication system, apparatus for operating a first node comprising:
a transmitter system that transmits a series of transmissions from said first node to a second node; and
a control processor that regulates transmitted power level of said series of transmissions in accordance with power measurements on made said series of transmissions wherein each of said received power levels has an influence on said transmitted power level and the influence of older ones of said power measurements on said transmitted power level varies with elapsed time since a most recent one of said power measurements.

27. The apparatus of claim 26 wherein said control processor receives from said second node information indicating said power measurements.

28. The apparatus of claim 26 wherein said control processor receives information from said second node indicating channel responses estimated based on said power measurements.

29. The apparatus of claim 28 wherein said control processor determines said transmitted power level based on said channel responses and a desired received power level.

30. The apparatus of claim 26 wherein said control processor receives differences between desired received power and actual received power from said second node.

31. The apparatus of claim 30 wherein said control processor smooths said differences to develop a smoothed difference value and determines said transmitted power level based on said smoothed difference values.

32. The apparatus of claim 30 wherein said control processor discards difference values received less than a predetermined time after a most recent upstream transmission.

33. The apparatus of claim 26 wherein said communication system comprises a point to multipoint communiation system, said first node comprises a subscriber unit, and said second node comprises a central access point.

34. The apparatus of claim 26 wherein said transmitter system encodes a current power level as data within said transmissions.

35. In a communication system, a method for operating a first node comprising:
receiving a series of transmissions from a second node;
measuring received power levels of said series of transmissions; and
sending power adjustment information to said second node to regulate output power level of said second node, wherein the power adjustment information is determined using a filter with smoothing parameters, the smoothing parameters being arranged to vary with elapsed time since a last one of said series of transmissions, and wherein each of said received power levels influences said output power level.

36. The method of claim 35 further including:
estimating a long term average power adjustment indicator and a short term average power adjustment indicator based on said received power levels using the filter.

37. The method of claim 36 wherein said long term average power adjustment indicator is maintained by a MAC layer and said short term average power adjustment indicator is maintain by a physical layer.

38. The method of claim 36 wherein sending includes:
   maintaining a FIFO queue of power adjustment information data items to be sent downstream from said first node; and
   if said queue already contains previous power adjustment information addressed to said second node, overwriting said previous power adjustment information with new power adjustment information.

39. The method of claim 38 wherein said power adjustment information addressed to said second node is identified by an MCNS primary subscriber ID of said second node.

40. In communication system, an apparatus for operating a first node comprising:
   a receiver system that receives a series of transmissions from a second node and measures received power levels of said series of tranmissions; and
   a control processor that sends power adjustment information to said second node to regulate output power level of said second node, wherein the power adjustment information is determined using a filter with smoothing parameters, the smoothing parameters being arranged to vary with elapsed time since a last one of said series of transmissions, and wherein each of said received power levels influences said output power level.

41. The method of claim 10 wherein said transmitted power level is a power level transmitted at given time, and the influence of older ones of said power measurements on said transmitted power level at the given time varies with elapsed time since the most recent one of said power measurements.

42. The method of claim 1 wherein said power adjustment information is sent at a given time, and the influence of each of said received power levels on said output power level at the given time varies with elapsed time since the last one of said series of transmissions.

* * * * *